(12) United States Patent
Rivers et al.

(10) Patent No.: US 6,806,422 B1
(45) Date of Patent: Oct. 19, 2004

(54) ENCLOSURE FOR TELECOMMUNICATION EQUIPMENT

(75) Inventors: Paul Brent Rivers, Cullman, AL (US); Frederick James Diggle, Birmingham, AL (US); Jeffrey D. Witter, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/434,778

(22) Filed: May 9, 2003

(51) Int. Cl.[7] ............................................. H02G 3/08
(52) U.S. Cl. ............................. 174/50; 174/53; 174/57; 361/600; 312/283
(58) Field of Search ................................ 174/50, 66, 67, 174/135, 17 R, 53, 58; 220/3.2, 3.3, 3.8, 4.01; 312/283, 100, 107, 109, 258, 287, 249.3; 361/600, 616, 610, 641, 724, 816, 625

(56) References Cited

U.S. PATENT DOCUMENTS

| | | | |
|---|---|---|---|
| 2,568,009 A | * | 9/1951 | Johnson ........................ 52/201 |
| 4,371,757 A | | 2/1983 | Debortoli et al. |
| 4,600,254 A | * | 7/1986 | Whalen ........................ 312/110 |
| 4,967,924 A | * | 11/1990 | Murofushi et al. ........... 220/3.8 |
| 5,148,348 A | * | 9/1992 | White ............................ 174/67 |
| 5,378,058 A | * | 1/1995 | Tessmer ..................... 312/223.6 |
| 5,465,528 A | | 11/1995 | Schinzel et al. |
| 5,476,316 A | * | 12/1995 | Batroney et al. ............. 312/100 |
| 5,621,192 A | * | 4/1997 | Bordwell et al. .............. 174/67 |
| 5,779,083 A | * | 7/1998 | Bordwell ...................... 220/3.8 |
| 5,783,775 A | * | 7/1998 | Marusinec ..................... 174/50 |
| 5,901,868 A | * | 5/1999 | Fahey et al. ................... 174/50 |
| 6,066,802 A | * | 5/2000 | Reinke et al. ................. 174/50 |
| 6,075,207 A | | 6/2000 | Sielaff et al. |
| 6,229,707 B1 | * | 5/2001 | Keenan et al. .............. 361/724 |
| 6,317,320 B1 | | 11/2001 | Cosley et al. |
| 6,382,749 B1 | * | 5/2002 | Stetson ........................ 312/322 |
| 6,494,252 B1 | | 12/2002 | Takala et al. |

OTHER PUBLICATIONS

U.S. patent application No. 10/413,918 dated Apr. 15, 2003.
U.S. patent application No. 10/436,170 dated May 12, 2003.
U.S. Patent Application for Articulated Arm with Tool and Test Set Platform Plus Bracket (ARTPET).
U.S. Patent Application for Cross Box Side Mount Umbrella Bracket.
U.S. Patent Application for Portable Umbrella Pole Door Clip.

* cited by examiner

Primary Examiner—Dean A. Reichard
Assistant Examiner—Angel R. Estrada
(74) Attorney, Agent, or Firm—Kirkpatrick & Lockhart LLP

(57) ABSTRACT

An enclosure having a housing defining an access opening. The housing defines an external portion and an interior portion and includes a first door pivotally connected to the housing via a first hinge. The first door is pivotally moveable between a closed position and an open position about a first pivot axis defined by the first hinge. The housing further includes a shield connected to the housing via a second hinge. The shield is pivotally moveable between a closed position and an open position about a second pivot axis defined by the second hinge.

36 Claims, 5 Drawing Sheets

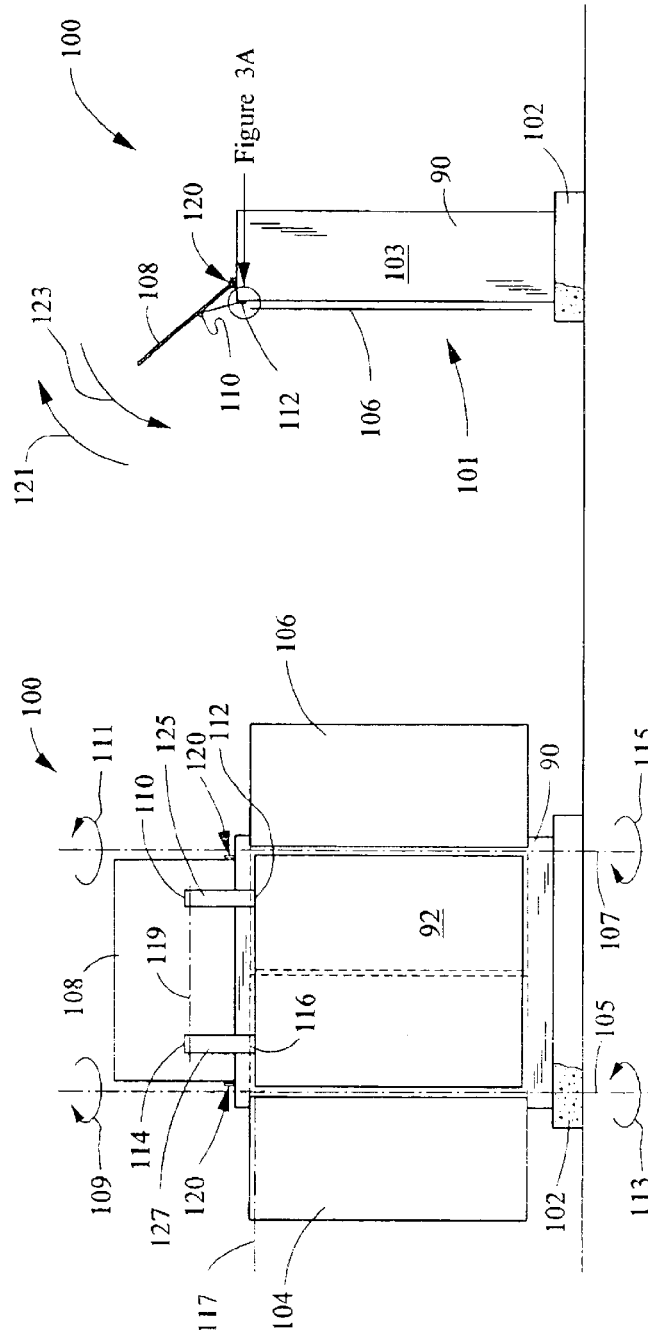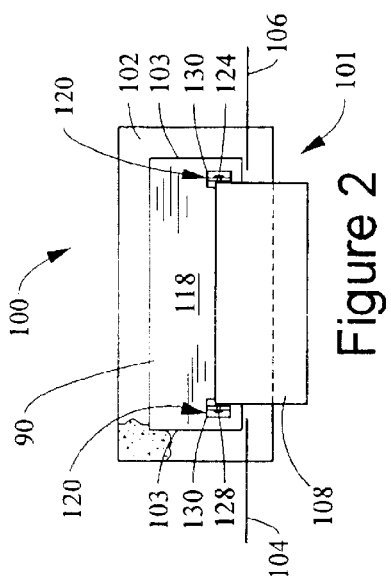

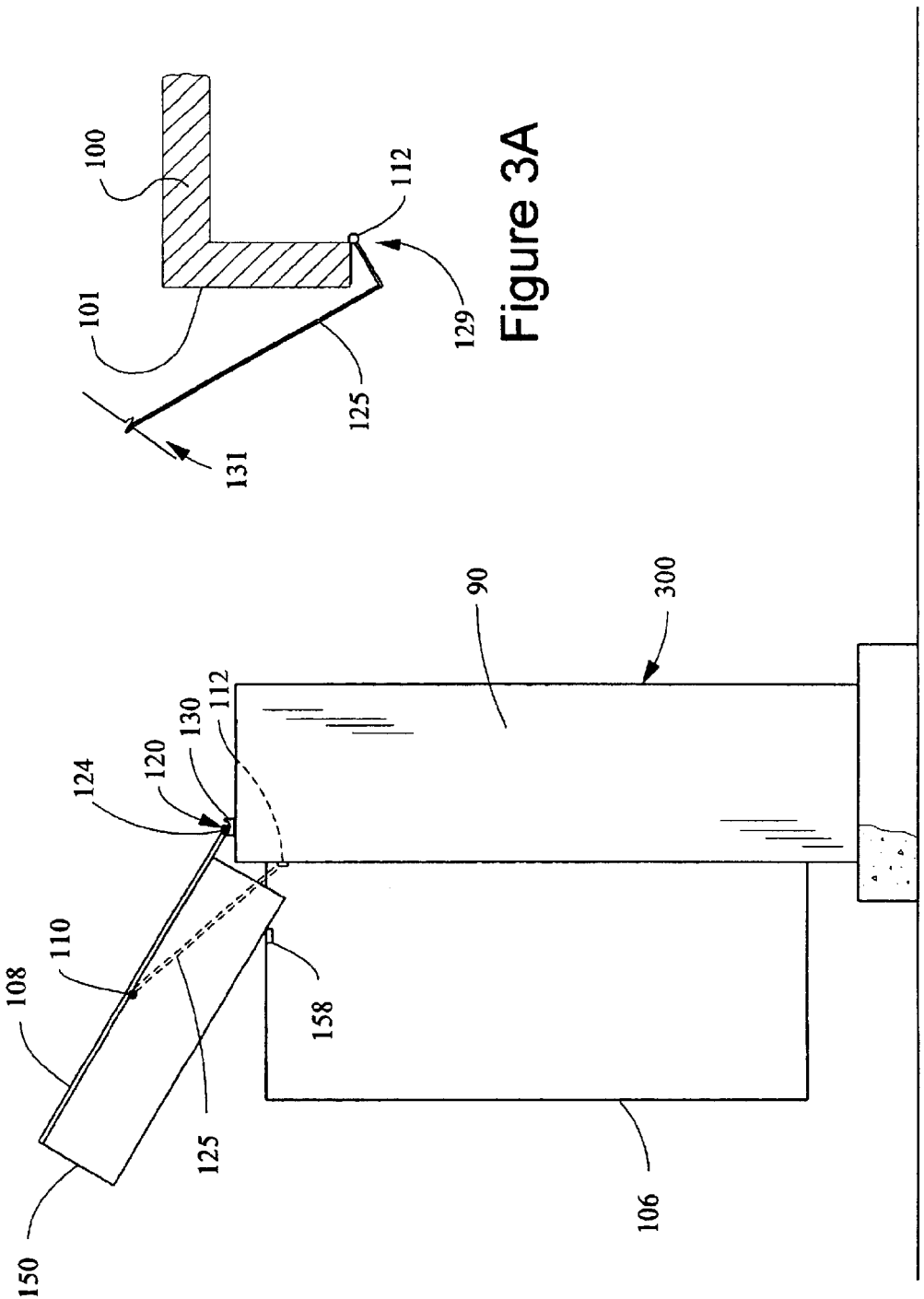

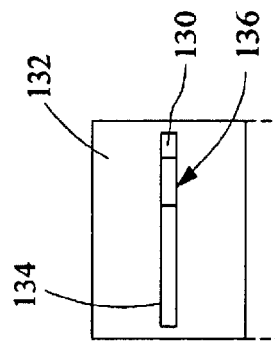
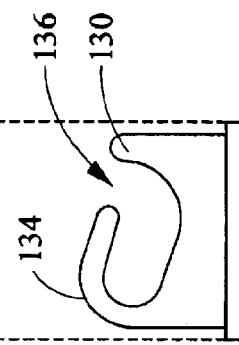
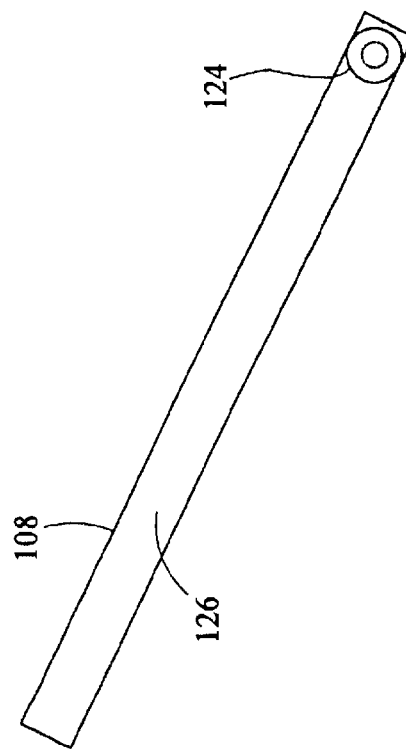
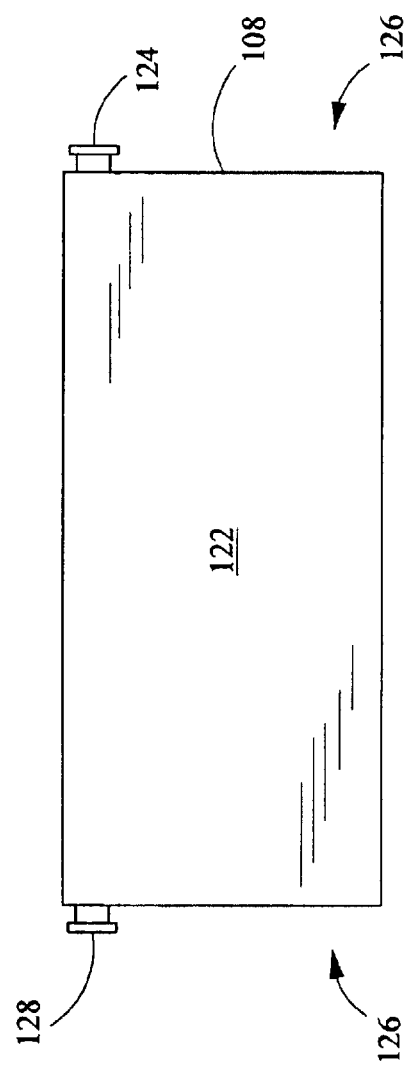

ENCLOSURE FOR TELECOMMUNICATION EQUIPMENT

BACKGROUND

In the telecommunication industry, it is common practice to locate electrical and electronic hardware devices and equipment outdoors. Generally, the hardware and equipment is located in an enclosure to protect it from ambient weather and other environmental conditions. These enclosures may be formed of several materials such as metal, polymer, plastic, ceramic, glass, crystal, and/or combinations thereof. Also, the enclosures may be formed of any shape.

Because these enclosures are generally installed outdoors, electrical and/or electronic hardware devices enclosed therein must be protected against interfering electromagnetic radiation and other environmental influences, such as sun, rain, snow, hail, windblown matter, and any types of inclement weather conditions.

When it is necessary to perform service on the electrical and/or electronic devices contained in the outdoor enclosures, technicians must provide the service at the site where the enclosure is located. When service is required during inclement weather conditions, there exists a chance that any electrical equipment and/or electronic hardware devices or other equipment located inside the enclosure will be affected by the inclement weather. This is true whether it is driving rain, wind, blown sand, dust, dirt, and sun. Also, the technician needs protection while servicing the equipment in such inclement weather conditions. Therefore, when the technicians are servicing the electrical and/or electronic hardware devices and other equipment contained in the outdoor enclosure during equipment upgrades, testing, maintenance, service outage problems, and other service requirements, the technician and the electrical and/or electronic hardware devices and other equipment must be protected to prevent them from exposure to inclement weather conditions and degrading over time. Telecommunication systems failures due to degraded electrical and/or electronic hardware devices and other equipment cause unnecessary labor costs associated with the replacement of the electrical and/or electronic hardware devices and other equipment. This includes the labor costs associated with sending a technician in the field to perform the repairs, the cost of having customers or users out of service, and any other costs associated with making unnecessary trouble shooting calls.

SUMMARY

In one general respect, an embodiment of the present invention is directed to an apparatus that includes an enclosure. The enclosure includes a housing defining an access opening, wherein the housing defines an external portion and an interior portion; a first door pivotally connected to the housing via a first hinge, wherein the first door is pivotally moveable between a closed position and an open position about a first pivot axis defined by the first hinge; and a shield connected to the housing via a second hinge, wherein the shield is pivotally moveable between a closed position and an open position about a second pivot axis defined by the second hinge.

According to another embodiment, the present invention is directed to an apparatus that includes a shield. The shield includes a substantially rectangular body having a top surface and first and second lateral portions; at least a first latch button attached to at least one of the lateral portions, wherein the latch button is adapted to releaseably engage a first hook; and at least a first hinge arm having a first and second end, wherein the first end is attached to the bottom surface and the second end is attachable to a housing.

In yet another embodiment, the present invention is directed to an enclosure. The enclosure includes housing means defining an access opening and defining an external portion and an interior portion; accessing means pivotally connected to the means for housing via a first hinge, wherein the accessing means is pivotally moveable between a closed position and an open position about a first pivot axis defined by the first hinge; means for shielding connected to the means for housing via a second hinge, wherein the means for shielding is pivotally moveable between a closed position and an open position about a second pivot axis defined by the second hinge.

DESCRIPTION OF THE DRAWINGS

Embodiments of the present invention are described herein in conjunction with the following figures, wherein:

FIG. 1 is a front view of an enclosure in accordance with one embodiment of the present invention;

FIG. 2 is a top view of an enclosure in accordance with one embodiment of the present invention;

FIG. 3 is a side view of an enclosure in accordance with one embodiment of the present invention;

FIG. 4 is a top view of a shield in accordance with one embodiment of the present invention;

FIG. 5 is a side view of a shield in accordance with one embodiment of the present invention;

FIG. 6 is a side view of a fastener in accordance with one embodiment of the present invention;

FIG. 6A is a top view of a fastener in accordance with one embodiment of the present invention;

FIG. 8 is a side view of an enclosure in accordance with another embodiment of the present invention showing a shield and a wing deployed in an open position.

DESCRIPTION

Figure 7:
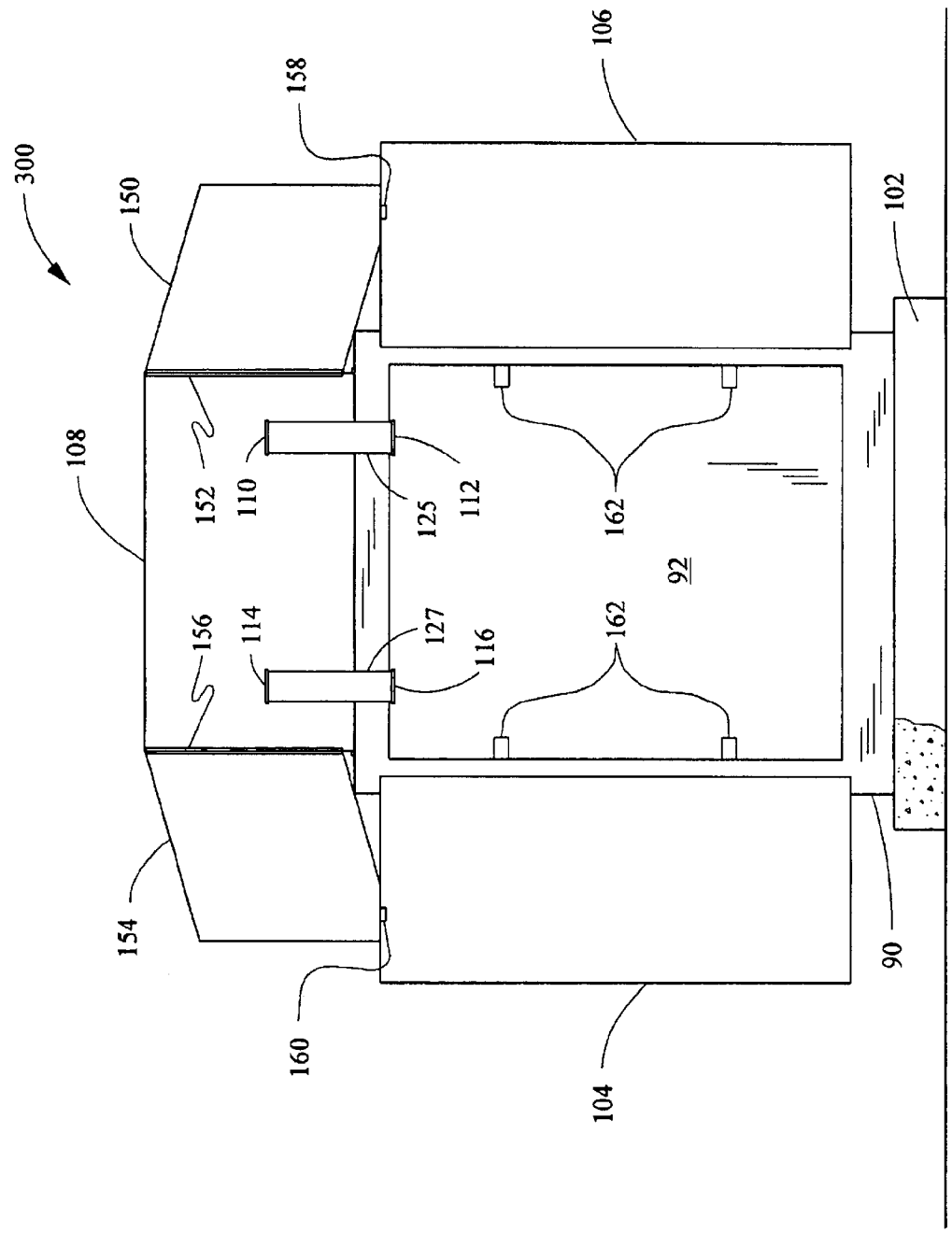
FIG. 7 illustrates an enclosure in accordance with another embodiment of the present invention.

Referring now to the several drawings in which identical elements are numbered identically throughout, a description of this invention now will be provided, in which exemplary embodiments are shown in the several figures. This invention may, however, be embodied in many different forms and should not be construed as being limited to the embodiments set forth herein. Rather, these embodiments are provided so that this disclosure will be thorough and complete, and will fully convey the scope of the invention to those having ordinary skill in the art. Furthermore, all statements herein reciting embodiments of the invention, as well as specific examples thereof, are intended to encompass both structural and functional equivalents thereof. Moreover, it is intended that such equivalents include both currently known equivalents as well as equivalents developed in the future for performing the same function, regardless of structure. Thus, those skilled in the art will appreciate that the schematic drawings presented herein and the like, represent conceptual views of illustrative structures which may embody the various aspects of this invention.

In the claims appended hereto any element expressed as a means for performing a specified function is to encompass any way of performing that function including, for example, a combination of elements that perform that function. Furthermore the invention as defined by such means-plus-function claims resides in the fact that the functionalities provided by the various recited means are combined and brought together in the manner that the claims called for. Therefore, any means that can provide such functionalities may be considered equivalents to the means shown herein.

In one embodiment, the present invention provides an enclosure or any other structure for enclosing or protecting electrical and/or electronic hardware devices and/or telecommunications equipment contained therein from environmental conditions including inclement weather such as rain, snow, wind, sleet, and ice, and other environmental conditions such as sun and wind blown sand, dust, and dirt. The enclosure may provide protection from these environmental conditions when a technician is servicing the electrical and/or electronic hardware devices and/or telecommunications equipment located inside the enclosure. One embodiment of the present invention includes means for protecting any electrical and/or electronic hardware devices and/or telecommunications equipment located inside the enclosure from any of the environmental conditions and forces including those described above. Such means for protecting may be contained or stored in an interior portion of the enclosure and may be adapted to be removed from the interior portion of the enclosure and removeably attached or fixed to a portion of the enclosure in such a manner as to provide a shield against any adverse environmental conditions and elements including those described above.

In one embodiment of the present invention, such means for protecting may include a substantially flat weather shield pivotally attached to the enclosure. The shield may be hinged and may be stowed inside the enclosure when not in use. In use, a technician may deploy the shield by rotating the shield about the pivot axis formed by the hinges out of the enclosure in an outwardly and upwardly direction. Once deployed in an open condition, a latch, or other similar hardware attached to the enclosure, may secure the shield to prevent the shield from dislodging or collapsing during use. Once deployed, the technician may conduct a service call while protecting himself (or herself) and the electrical and/or electronic hardware devices and/or telecommunications equipment contained therein from environmental conditions.

The shield in accordance with one embodiment of the present invention may be fabricated from a variety of materials such as metals, alloys, plastics, or ceramics suitable for withstanding various outdoor environmental conditions including but not limited to a wide range of temperatures, sunlight, humidity, moisture, rain, sleet, snow, ice, airborne or windblown sand, dust and dirt, and other environmental conditions, forces or elements.

FIGS. 1–3 illustrate a front view, top view, and side view, respectively, of an enclosure in accordance with one embodiment of the present invention. The term "enclosure" as used throughout this description and claims may comprise any type of terminals, closures, housings, cabinets, and other devices and structures for locating electronic devices therein. The term "electronic devices" as used throughout this description and claims may comprise any type of electrical hardware devices, electronic hardware devices, electrical components, electronic components, circuit boards, telecommunications equipment, and/or any other equipment. As used throughout the description, "environmental conditions" include but are not limited to a wide range of ambient temperatures, sunlight, humidity, moisture, rain, sleet, snow, ice, and airborne or windblown sand, dust and dirt prevalent in outdoor environments.

Although the specific embodiments of the several example enclosures described this description have a substantially rectangular polygonal shape, the scope of the present invention is intended to encompass any enclosures having any shape or form for performing the function of containing, housing, and/or protecting the electronic devices located inside the enclosure regardless of its shape or size.

In accordance with one embodiment of the present invention the enclosure may include a conventional telecommunications cabinet adapted with a shield. The Universal Series Cross-Cabinet manufactured by Marconi Communications is one example of a telecommunications cabinet that can be adapted and/or fitted with a shield in accordance with one embodiment of the present invention. Nevertheless, a variety of enclosures comprising cabinets fitted with shields may be used to implement various embodiments of the present invention.

With reference now to FIG. 1, one embodiment of the present invention includes an enclosure 100 which maybe secured to a concrete pad 102. As illustrated therein, the enclosure 100 may include a housing 90 having a substantially rectangular or square polygonal shape. Those skilled in the art will appreciate, however, that the enclosure 100 may take on a variety of shapes and forms without departing from the scope of the present invention.

In one embodiment, the enclosure 100 may be formed from a variety of suitable materials such as metals, alloys, plastics, and ceramics capable of withstanding various outdoor environmental conditions. In one embodiment, the enclosure 100 may be formed from any suitable engineering material such as metal, alloy, plastic, or ceramic used in the fabrication of machinery, machinery components, structural shapes, tools, instruments, and other items. Their hardness, strength, machinability, dimensional stability, nonflammability, and resistance to corrosion, acids, solvents, and heat may characterize the properties of such suitable engineering materials. Examples of such suitable engineering materials include but are not limited to: metals and alloys such as aluminum, beryllium, brass, bronze, cast iron, copper, lead, magnesium, steel, tantalum, zinc, zirconium, and various other trademarked alloys; ceramics such as glass and porcelain; and plastics such as ABS resin, acetal resin, acrylic resin, fluorocarbon polymer, nylon, phenol formaldehyde resin, polybutilene terephthalate, polycarbonate, polyethylene, polyphenylene oxide, polypropylene, polystyrene, polyvinyl chloride, reinforced plastics (FRP), and ureaformaldehyde resin. The enclosure 100 also may be formed from any of the engineering materials recited above, and/or any combinations thereof, and may include suitable coatings capable of withstanding a variety of outdoor environmental conditions including those described above. In one embodiment of the present invention, for example, the enclosure may be formed of G90 galvanized steel having a durable finish coating, such as a polyurethane powder coating.

In one embodiment of the present invention, the enclosure 100 may include a housing 90 having at least one access door 104 at a front portion 101 of the enclosure 100, a top portion 118, and a pair of sidewalls 103. The housing 90 may include a second access door 106 or a plurality of access doors at the front portion 101. The access doors 104, 106 may be pivotally attached to the housing 90 with one or more hinges such that the access doors 104, 106 may be pivotally movable from an open position (as shown in FIG.

1) to a closed position (shown in phantom in FIG. 1) about pivot axes 105 and 107 associated with each access door 104 and 106, respectively, for example. In one embodiment of the present invention the access doors 104, 106 may pivot about axes 105, 107, respectively, such that they may be rotated, revolved, swiveled, or spun to an open position in the direction shown by arrows 109 and 111, respectively. Conversely, the access doors 104 and 106 may pivot about axes 105 and 107, respectively, such that they may be rotated, revolved, swiveled, or spun to the closed position in the direction shown by arrows 113, 115, respectively. The doors 104, 106 may be in an overlapping arrangement when they are in a closed position.

In one embodiment of the present invention, the enclosure 100 also may include a shield 108 pivotally attached to the top portion 118 of the housing 90 with one or more hinges such as, for example, a first pair of hinges 110, 112, for example. The shield may include a substantially rectangular body having a top surface 122 and first and second lateral portions 126. The first pair of hinges 110, 112 may be attached to each other with a first rigid strap or hinged arm 125. One hinge 110 is attached to the shield 108 and the other hinge 112 is attached to the housing 90. The enclosure 100 also may include a second pair of hinges 114, 116 attached to each with a second rigid strap or hinged arm 127, wherein one hinge 114 is attached to the shield 108 and the other hinge 116 is attached to the housing 90. The hinges 112 and 116 define a first pivot axis 117 about which the shield 108 may be rotated, revolved, swiveled, or spun to an open operating position outside the enclosure 100 and to a closed storage position inside the housing 90. The hinges 110 and 114 define a second pivot axis 119 about which the shield 108 may be rotated, revolved, swiveled, or spun to an open and closed position.

When not being used the shield 108 may be stored inside an interior portion 92 of the housing 90. In one example, when the access doors 104, 106 are closed, the shield 108 may be stored inside the housing 90 behind the access doors 104, 106. The shield 108 may be pivotally movable about the first and second pair of hinges 110, 112, 114, 116 from a storage position inside the interior portion 92 of the housing 90 to an open position wherein the shield 108 is pulled out and swung in an outwardly and upwardly direction and latched at latch point 120. The hinges 110 and 114 maybe attached to the shield 108 by welding, bolts, screws, rivets, clamps, magnets, epoxy, glue, cement, adhesives, and other means of attachment. Similarly, the hinges 112, 116 may be attached to the housing 90 by welding, bolts, screws, rivets, clamps, magnets, epoxy, glue, cement, adhesives, and other means of attachment.

FIG. 2 is a top view of the enclosure 100 in accordance with one embodiment of the present invention with the shield 108 shown deployed in a fixed open and latched position at the latch point 120. As illustrated therein, the access doors 104, 106 are shown in the open position. The shield 108 also is shown in the open position and is fixed to the top portion 118 of the enclosure 100 at the latch point 120 by a fastener attached to the housing 90. The fastener may comprise, for example, a hook, clasp, clip, catch, hook and eye, stud, and the like. In one embodiment of the present invention the fastener may be a latch for securing the shield 108 to the housing 90. For example, a hook 130 (see FIGS. 6 and 6A) fixedly attached to the housing 90 that mates with a latch button 124, 128 (see FIGS. 4 and 5) fixedly attached to the shield 108 may form a latch for securing the shield 108 to the housing 90. Those skilled in the art will appreciate that other types of hardware and fasteners may be used to fix the shield 108 to the open position without departing from the scope of the invention.

FIG. 3 is a side view of the enclosure 100 in accordance with one embodiment of the present invention. As illustrated therein, the shield 108 is shown deployed in the open and latched position. As discussed above with reference to FIG. 2, the shield 108 may be latched to the top portion 118 of the housing 90 at the latch point 120 comprised of hook 130 and latch buttons 124 and 128, for example. The shield 108 may be deployed to the open position by first opening the access doors 104, 106 and pivoting the shield about both pivot axes 117, 119 formed by the hinges 110, 112, 114, 116 in the general direction indicated by arrow 121. Once the shield 108 is deployed in the open position, it may be secured at the latch point 120 by various hardware or fasteners. Once the shield 108 is deployed in the open position and fixed to the top portion of the housing 90, the shield 108 may function to protect both the technician and the electronic devices located inside the housing 90 against adverse environmental conditions when the electronic devices are being serviced. The shield 108 may be returned to the storage position inside the housing 90 by pivoting the shield 108 to the closed position by pivoting it about both pivot axes 117, 119 in the general direction indicated by arrow 123. The access doors 104, 106 then may be closed.

FIG. 3A is a detailed view of the hinge 112 located on either side of the enclosure 100, for example, for pivotally moving the shield 108 in the open and closed positions according to one embodiment of the present invention. The first end 129 of the hinged arm 125 attaches to the hinge 112 and pivotally moves about that point at the front portion 101 of the enclosure. The second end 131 of the hinged arm 125 pivotally attaches to the shield 108 (not shown) wherein the shield pivotally moves about that point. The hinged arm 127 may be attached to the housing 90 and the shield 108 in a similar manner.

FIG. 4 is a top view of the shield 108 showing the top surface 122 and the latch buttons 124, 128 extending from the lateral portions 126 thereof according to one embodiment of the present invention. Those skilled in the art will appreciate that the shield 108 may include at least one latch button 124 or a plurality of latch buttons 124 for fixing the shield 108 in the open position. The latch button 124 may be formed as an integral part of the shield 108 or may be fixedly attached thereto by welding, bolts, screws, rivets, clamps, magnets, epoxy, glue, cement, adhesives, and other means of attachment.

FIG. 5 is a side view of the shield 108 showing the lateral portion 126 and the latch button 124 according to one embodiment of the present invention. In one embodiment of the present invention, the shield 108 may include a first latch button 124 on a first side of the shield 108 and a second latch button 128 on a second side of the shield 108. Two latch buttons 124, 128 may be inserted and engaged with the hook 130 at latch points 120 to removeably attach and hold the shield 108 in the open position once it is deployed. Generally, the latch points 120 maybe located on the top portion 118 of the housing 90 or on the sidewall 103 portions thereof without departing from the scope of the invention.

FIGS. 6 and 6A illustrate a side view and a top view, respectively, of one embodiment of a hook 130 that may be used to cooperate with and engage the latch buttons 124, 128 for removeably attaching the shield 108 to the housing 90 once the shield 108 is deployed in the open position. The hook 130 may include a base portion 132 having flared portions for attaching it to the top portion 118 of the housing

90. The hook 130 also may include a hook portion 134 for retainingly engaging the latch button 124 and an opening 136 in the form of a notch for receiving the latch button 124 therein. The hook 130 may be formed integrally with the enclosure 100 or may be attached thereto by welding, bolts, screws, rivets, clamps, magnets, epoxy, glue, cement, adhesives, and other means of attachment.

Accordingly, once the shield 108 is placed in an open position by pivoting the shield 108 in an upward direction indicated by arrow 121, the shield 108 is engaged in the hook 130 by the latch button 124 and thereby forms the latch point 120. The latch point 120 maintains the shield 108 in the open position while the technician services the electronic devices located inside the housing 90. In one embodiment of the present invention, the latch buttons 124, 128 may slidingly engage with the hook 130 through an opening 136 in the form of a notch. The hook portion 134 thus retains the shield 108 in the open position and prevents it from closing. To place the shield 108 in its storage position in the interior portion 92 of the housing 90, the latch buttons 124, 128 of the shield 108 are slidingly disengaged out from the opening 136 and the shield 108 is pivotally moved in a downward direction as indicated by arrow 123 about the pivot axes 117, 119. The access doors 104 and 106 are then closed in the direction shown by arrows 113, 115 about the pivot axes 105, 107, respectively, over top of the shield 108 and the enclosure 100 may be locked for its normal operating condition.

Those skilled in the art will appreciate that the hinges may be fastened to the shield 108, the hook 130, and the housing 90 with a variety of means of attachment including but not limited to welding, adhesively securing with epoxy, glue, cement, adhesives, and other means of attachment. The hinges also may be fastened to the shield 108, the hook 130, and the housing 90 with a variety of hardware and fasteners such as screws, nuts, bolts, rivets, clamps, and magnets, and other means of attachment.

Those skilled in the art will appreciate that the shield 108 may be formed from any suitable engineering material such as metal, alloy, plastic, or ceramic used in the fabrication of machinery, machinery components, structural shapes, tools, instruments, and other items. Their hardness, strength, machinability, dimensional stability, nonflammability, and resistance to corrosion, acids, solvents, and heat may characterize the properties of such suitable engineering materials. Examples of such suitable engineering materials include but are not limited to: metals and alloys such as aluminum, beryllium, brass, bronze, cast iron, copper, lead, magnesium, steel, tantalum, zinc, zirconium, and various other trademarked alloys; ceramics such as glass and porcelain; and plastics such as ABS resin, acetal resin, acrylic resin, fluorocarbon polymer, nylon, phenolformaldehyde resin, polybutilene terephthalate, polycarbonate, polyethylene, polyphenylene oxide, polypropylene, polystyrene, polyvinyl chloride, reinforced plastics (FRP), and ureaformaldehyde resin. The shield also may be formed from any of the engineering materials recited above, and/or any combinations thereof, with appropriate coatings adequate to withstand outdoor environmental conditions. In one embodiment of the present invention, for example, the shield may be formed of G90 galvanized steel having a durable finish coating, such as a polyurethane powder coating. In other embodiments of the present invention, the shield may be formed from light-weight materials and also may be formed from non-electrically-conductive materials.

Although the shield 108 is generally depicted throughout the various views as having a rectangular shape, the present invention is not intended to be limited to shields 108 having a rectangular shape. For example, the shield 108 may be formed from a variety of shapes suitable for performing the intended function of shielding the technician and/or the electronic devices from environmental conditions as described above.

FIG. 7 illustrates another embodiment of the enclosure 300 in accordance with the present invention including a shield 108 comprising at least a first side wing 150 pivotally attached thereto by a first hinge 152. The enclosure 300 also may include a housing 90 having a shield 108 that includes a second side wing 154 pivotally attached thereto by a second hinge 156. The wings 150, 154 also may include first and second wing catches 158, 160, respectively, for retainingly securing the wings 150, 154 to the access doors 106, 104, respectively, when the wings 150, 154 are deployed in the open position. The first and second wing catches 158, 160 may be attached to the first and second doors 104, 106, respectively, of the housing 90 using a variety of means of attachment including but not limited to welding, adhesively securing with epoxy, glue, cement, adhesives, and other means of attachment. The wings 150, 154 also may be attached to the doors 106, 104, respectively, with a variety of hardware and fasteners such as screws, nuts, bolts, rivets, clamps, and magnets, and other means of attachment.

The first and second wings 150, 154 may be fully retracted inside the housing 90 when not in use. The enclosure 300 also may include one or more rest stops with catches 162 secured to the side portions 164 of the housing 290. The rest stops 162 operate to prevent the shield 108 and the first and second wings 150, 152 from swinging all the way inside the housing 90 when placed in the storage position in the interior portion 92 of the enclosure 90.

In one embodiment of the present invention, the shield 108 may be attached to the housing 90 with a first hinged arm 125 and in another embodiment, the shield may be attached to the housing 90 with a second hinged arm 127 or a plurality of hinged arms. As described previously, the hinged arm 125 may include a first hinges 112 at one end to pivotally attach the hinged arm 125 to the housing 90. The first hinged arm 125 also may include a second hinge 110 to pivotally attach the hinged arm 125 to the shield 108. Likewise, the second hinged arm 127 also may include the first and second hinges 116 and 114 to pivotally attach the second hinged arm 127 to the housing 90 and the shield 108, respectively.

FIG. 8 is a side view of the enclosure 300 showing the shield 108 and the wing 150 deployed in the open position and the access door 106 in the open position according to one embodiment of the present invention. The wing 150 is attached to the first wing catch 158. As described previously, on one end the shield 108 is pivotally attached to the hinge arm 125 with hinge 110 and on the other end the hinge arm 125 is pivotally attached to the housing 90 with hinge 112. The wing 150 is shown latched to the wing catch 158 to keep from moving. The shield 108 is shown removeably attached to the latch point 120 by means of the hook 130 and latch button 124.

Figure 9:
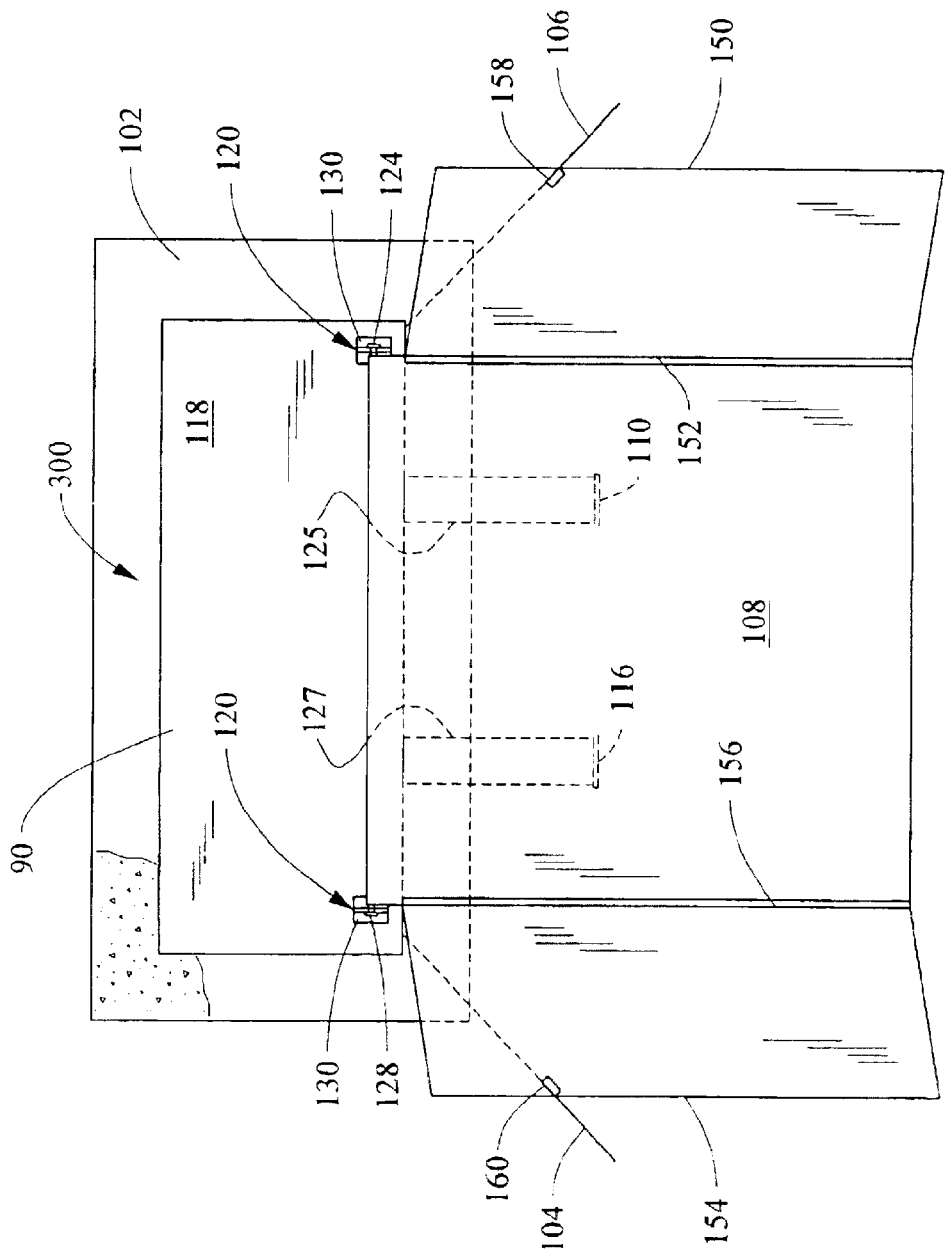
FIG. 9 is a top view of an enclosure in accordance with another embodiment of the present invention showing wings deployed in the open position.

FIG. 9 is a top view of the enclosure 300 with the shield 108 and the wings 150, 154 deployed in the open position according to one embodiment of the present invention. The hooks 130 and the latch buttons 124, 128 may be used to removeably latch the shield 108 to the top portion 118 of the housing 90. The access doors 104, 106 are in the open position and the wings 150, 154 are removeably attached to the access doors 106, 104, respectively, to support the wings 150, 154 and keep them from moving while deployed in the open position.

Those of ordinary skill in the art will recognize that many modifications and variations of the present invention may be implemented without departing from the scope of the invention. For example, although the various components of the invention may be modified and varied, the foregoing description and the following claims are intended to cover all such modifications and variations. Furthermore, the materials and processes disclosed are illustrative, but are not exhaustive. Other materials and processes also may be used to make devices embodying the present invention.

What is claimed is:

1. An enclosure, comprising:
   a housing defining an access opening, wherein the housing defines an external portion and an interior portion;
   a first door pivotally connected to the housing via a first hinge, wherein the first door is pivotally moveable between a closed position and an open position about a first pivot axis defined by the first hinge; and
   a shield connected to the housing via a second hinge, wherein the shield is pivotally moveable between a closed position and an open position about a second pivot axis defined by the second hinges;
   wherein the shield further comprises at least one latch button disposed on a lateral portion of the shield for securing the shield to the housing when the shield is deployed in the open position.

2. The enclosure of claim 1, wherein the second hinge is horizontally attached to the housing.

3. The enclosure of claim 1, further comprising:
   a first hinge arm having a first end and a second end, wherein the first end is attached to the second hinge; and
   a third hinge attached to both the shield and the second end of the first hinge arm, wherein the shield is pivotally movable about a third pivot axis defined by the third hinge.

4. The enclosure of claim 3, further comprising:
   a second hinge arm having a first end and a second end, wherein the first end is attached to a fourth hinge attached to the housing; and
   a fifth hinge attached to both the shield and the second end of the second hinge arm, wherein the shield is pivotally movable about the third pivot axis defined by the third hinge and the fifth hinge.

5. The enclosure of claim 1, further comprising a fastener attached to the housing for retainingly engaging the shield thereto by receiving the at least one latch button when the shield is in the open position, wherein the fastener further comprises a latch.

6. The enclosure of claim 1, further comprising a second door pivotally connected to the housing by a third hinge, wherein the second door is pivotally moveable between a closed position and an open position about a third pivot axis defined by the third hinge.

7. The enclosure of claim 1, wherein the housing is formed from materials selected from the group consisting of metals, alloys, plastics, and ceramics.

8. The enclosure of claim 1, wherein the shield is formed from materials selected from the group consisting of metals, alloys, plastics, ceramics, and non-electrically-conductive materials.

9. The enclosure of claim 1, further comprising a first wing pivotally connected to the shield via a third hinge, wherein the wing is pivotally moveable about a third pivot axis, defined by the third hinge.

10. The enclosure of claim 9, further comprising a second wing pivotally connected to the shield via a fourth hinge, wherein the wing is pivotally moveable about a fourth pivot axis defined by the fourth hinge.

11. An enclosure, comprising:
    housing means defining an access opening and defining an external portion and an interior portion;
    accessing means pivotally connected to the means for housing via a first hinge, wherein the accessing means is pivotally moveable between a closed position and an open position about a first pivot axis defined by the first hinge;
    means for shielding connected to the means for housing via a second hinge, wherein the means for shielding is pivotally moveable between a closed position and an open position about a second pivot axis defined by the second hinge;
    a first pivotally movable means for supporting having a first end and a second end, wherein the first end is attached to the second hinge;
    a third hinge attached to both the shield and the second end of the first pivotally movable means for supporting, wherein the means for shielding is pivotally movable about a third pivot axis defined by the third hinge;
    a second pivotally movable means for supporting having a first end and a second end, wherein the first end is attached to a fourth hinge attached to the means for housing; and
    a fifth hinge attached to both the shield and the second end of the second hinge arm, wherein the means for shielding is pivotally movable about the third pivot axis defined by the third hinge and the fifth hinge.

12. The enclosure of claim 11, wherein the means for shielding further comprises at least one means for latching disposed on a lateral portion of the means for shielding.

13. The enclosure of claim 11, further comprising means for fastening attached to the means for housing for retainingly engaging the means for shielding thereto, wherein the means for fastening further comprises a latch.

14. An enclosure, comprising:
    a housing defining an access opening, wherein the housing defines an external portion and an interior portion;
    a first door pivotally connected to the housing via a first hinge, wherein the first door is pivotally moveable between a closed position and an open position about a first pivot axis defined by the first hinge;
    a shield connected to the housing via a second hinge, wherein the shield is pivotally moveable between a closed position and an open position about a second pivot axis defined by the second hinge; and
    a fastener attached to the housing for retainingly engaging a latch button disposed on a lateral portion of the shield thereto by receiving the latch button when the shield is in the open position, wherein the fastener further comprises a latch.

15. The enclosure of claim 14, wherein the second hinge is horizontally attached to the housing.

16. The enclosure of claim 14, further comprising:
    a first hinge arm having a first end and a second end, wherein the first end is attached to the second hinge; and
    a third hinge attached to both the shield and the second end of the first hinge arm, wherein the shield is pivotally movable about a third pivot axis defined by the third hinge.

17. The enclosure of claim 16, further comprising:
    a second hinge arm having a first end and a second end, wherein the first end is attached to a fourth hinge attached to the housing; and a fifth hinge attached to both the shield and the second end of the second hinge arm, wherein the shield is pivotally movable about the third pivot axis defined by the third hinge and the fifth hinge.

18. The enclosure of claim 14, further comprising a second door pivotally connected to the housing by a third hinge, wherein the second door is pivotally moveable between a closed position and an open position about a third pivot axis defined by the third hinge.

19. The enclosure of claim 14, the housing is formed from materials selected from the group consisting of metals, alloys, plastics, and ceramics.

20. The enclosure of claim 14, wherein the shield is formed from materials selected from the group consisting of metals, alloys, plastics, ceramics, and non-electrically-conductive materials.

21. The enclosure of claim 14, further comprising a first wing pivotally connected to the shield via a third hinge, wherein the wing is pivotally moveable about a third pivot axis defined by the third hinge.

22. The enclosure of claim 21, further comprising a second wing pivotally connected to the shield via a fourth hinge, wherein the wing is pivotally moveable about a fourth pivot axis defined by the fourth hinge.

23. An enclosure, comprising:
   a housing defining an access opening, wherein the housing defines an external portion and an interior portion;
   a first door pivotally connected to the housing via a first hinge, wherein the first door is pivotally moveable between a closed position and an open position about a first pivot axis defined by the first hinge;
   a shield connected to the housing via a second hinge, wherein the shield is pivotally moveable between a closed position and an open position about a second pivot axis defined by the second hinge;
   a first hinge arm having a first end and a second end, wherein the first end is attached to the second hinge; and
   a third hinge attached to both the shield and the second end of the first hinge arm, wherein the shield is pivotally movable about a third pivot axis defined by the third hinge.

24. The enclosure of claim 23, wherein the second hinge is horizontally attached to the housing.

25. The enclosure of claim 23, further comprising:
   a second hinge arm having a first end and a second end, wherein the first end is attached to a fourth hinge attached to the housing; and
   a fifth hinge attached to both the shield and the second end of the second hinge arm, wherein the shield is pivotally movable about the third pivot axis defined by the third hinge and the fifth hinge.

26. The enclosure of claim 23, further comprising a second door pivotally connected to the housing by a fourth hinge, wherein the second door is pivotally moveable between a closed position and an open position about a fourth pivot axis defined by the fourth hinge.

27. The enclosure of claim 23, wherein the housing is formed from materials selected from the group consisting of metals, alloys, plastics, and ceramics.

28. The enclosure of claim 23, wherein the shield is formed from materials selected from the group consisting of metals, alloys, plastics, ceramics, and non-electrically-conductive materials.

29. The enclosure of claim 23, further comprising a first wing pivotally connected to the shield via a fourth hinge, wherein the wing is pivotally moveable about a fourth pivot axis defined by the fourth hinge.

30. The enclosure of claim 29, further comprising a second wing pivotally connected to the shield via a fifth hinge, wherein the wing is pivotally moveable about a fifth pivot axis defined by the fifth hinge.

31. An enclosure, comprising:
   a housing defining an access opening, wherein the housing defines an external portion and an interior portion;
   a first door pivotally connected to the housing via a first hinge, wherein the first door is pivotally moveable between a closed position and an open position about a first pivot axis defined by the first hinge; and
   a shield connected to the housing via a second hinge, wherein the shield is pivotally moveable between a closed position and an open position about a second pivot axis defined by the second hinge; and
   a first wing pivotally connected to the shield via a third hinge, wherein the wing is pivotally moveable about a third pivot axis defined by the third hinge.

32. The enclosure of claim 31, wherein the second hinge is horizontally attached to the housing.

33. The enclosure of claim 31, further comprising a second door pivotally connected to the housing by a fourth hinge, wherein the second door is pivotally moveable between a closed position and an open position about a fourth pivot axis defined by the fourth hinge.

34. The enclosure of claim 31, wherein the housing is formed from materials selected from the group consisting of metals, alloys, plastics, and ceramics.

35. The enclosure of claim 31, wherein the shield is formed from materials selected from the group consisting of metals, alloys, plastics, ceramics, and non-electrically-conductive materials.

36. The enclosure of claim 35, further comprising a second wing pivotally connected to the shield via a fourth hinge, wherein the wing is pivotally moveable about a fourth pivot axis defined by the fourth hinge.

* * * * *